3,047,534
GRAFT POLYMERIZATION ON A RUBBERY POLYMER IN AQUEOUS SUSPENSION EMPLOYING POLYVINYL ALCOHOL AND A METAL PHOSPHATE AS SUSPENDING AGENTS, AND PRODUCT OBTAINED THEREBY
Robert H. Dyer and Rene P. Brown, Big Spring, Tex., assignors to Cosden Petroleum Corporation, Big Spring, Tex., a corporation of Delaware
No Drawing. Filed Oct. 7, 1959, Ser. No. 844,871
31 Claims. (Cl. 260—45.5)

This invention relates generally to improved suspension polymerization of ethylenically unsaturated polymerizable monomers, and particularly to a method useful for graft polymerizing solutions of preformed polymer in polymerizable monomer by suspension polymerization, including a method wherein such solutions are first partially polymerized en masse and then converted to superior beads by suspension polymerizing without emulsification, using polyvinyl alcohol (PVA) and particles of insoluble phosphate in combination as suspending agent.

Our combination of polyvinyl alcohol and insoluble phosphate has been found to be so versatile as suspending agent that it will allow suspension polymerization in good yield, including graft polymerization of material heretofore not polymerizable by suspension. It will allow superior quality beads to be formed, controllably, of any of a wide range of ethylenically unsaturated polymerizable monomeric materials with a lower water to monomer ratio and without need for other, heretofore considered essential additives for the system. Thus a beter bead polymer is produced even for heretofore unsuspendable polymer solutions, and under more widely variable suspension conditions by using PVA and insoluble particles of phosphate in combination as suspending agent.

It was not practically possible heretofore in the art to simultaneously effect a good graft polymerization of a solution of preformed polymer in a polymerizable monomer; for instance, to graft polymerize a solution of rubber in monomeric styrene by suspension polymerization. Such solution, after partially polymerizing en masse, to effect a graft polymerization, or merely to form a viscous homogeneous solution of prepolymer of the crystallive type in liquid monomer, could not then be suspension polymerized to bead form using various common suspending agents, such as unsoluble phosphate particles as used conventionally as suspending agent, since the partially polymerized monomer solution of the rubbery graft tends to emulsify in such a suspension system.

It was also proposed in the art to suspension polymerize specific mixtures of monomers having a functionality exceeding two, such as divinyl benzene, using polyvinyl alcohol in a water to monomer ratio exceeding at least 5 to 1 and usually exceeding 15 to 1. The present method is critically improved over any past suspension polymerization practices in that the water to monomer solution ratio will usually be less than 2 to 1 and can be as low as 0.7 to 1. Moreover, a wide range of monomers and polymer solutions therein can now be polymerized in suspension using PVA combined with insoluble phosphate particles as suspending agent.

Finally, prior polymerization systems using conventional suspending agents like calcium phosphate particles, usually with surfactants and with lecithin as further disclosed in a copending application by Roy A. White, Serial No. 781,441, filed December 9, 1958, and assigned to the present assignee, tend often to agglomerate into a viscous tacky state after only slight partial polymerization to form large undispersible masses adhered to the agitator means, "lollipop"; and even after substantially complete polymerization, can remain so tacky as to coalesce into granular masses, "sugar clump." The criterion for reliable and reproducible control to produce hard clear beads has not been fully evaluated. The present system has that full reliability even while omitting many of the prior system components heretofore considered to be essential.

According to one aspect of this invention, polymers and copolymers formed in various polymerization systems including natural and synthetic rubbers and thermoplastic polymers, can be dissolved in a solvent comprising a liquid polymerizable ethylenically unsaturated monomer, and that solution with or without catalysts, graft polymerized en masse from about 5 to 40 percent of the liquid monomer. The partially polymerized liquid mass polymer can then be suspension polymerized to hard polymer beads using polyvinyl alcohol and insoluble phosphate particles as the suspending agent, the insoluble phosphate being usually calcium, barium or magnesium phosphate. That type of mass polymerized solution was not heretofore successfully polymerized in an aqueous suspension system using phosphate and other additives because it tends to emulsify in the system, being thereby inoperative or polymerizable in relatively low yield. The combination of the PVA with insoluble phosphate particles produces a much superior bead suspension of graft polymer of closely controlled particle sizes and of high quality. Moreover the use of both suspending agents in combination imparts easy reliable control with great flexibility to the system.

This combination of suspending agents allows wide variation in quantity of either, increasing one while decreasing the other. The combination allows above-stated reduction of water to monomer ratio well below that available in ordinary suspension systems. Moreover, certain usual suspension additives such as surfactants, acetic acid, acetate salts, lecithin and other additives often essentially used in suspension systems are not critically necessary in the present suspension polymerization and can be omitted.

The method, according to this aspect, involves first forming a mass polymer; that is, partially polymerizing up to 40% solution of a polymer, typically a synthetic rubber, GRS, in a monomer, such as styrene, en masse, about 5 to 40 percent of the monomer being first polymerized with heat, with or without a peroxy catalyst, and then suspending that mass to complete the graft polymerization as a suspension to bead form, using PVA with insoluble phosphate, typically hydroxy apatite, as the suspending agent. Thus various polymers such as GRS rubber usually 75/25 butadiene-styrene including usual rubbery variations from that formula, ranging from small quantities of polystyrene to large polybutadiene, large polystyrene and small polybutadiene can be graft polymerized. Other examples of polymerized dienes are polybutadiene polyisoprene, polypiperylene, polyisobutylene, polyl 2,3-dimethyl butadiene, polychloroprene, polycyclopentadiene, natural rubbers, chlorinated rubber and other higher polymerized dienes, copolymers of butadiene with acrylonitrile, copolymers of styrene with acrylonitrile, copolymers of styrene with isobutylene, and copolymers of butadiene with isobutylene. Other examples of ethylenically unsaturated monomers are the vinyl aromatics, such as styrene, methyl styrene, chlorostyrene, divinyl benzine, vinyl napthalene, vinyl pyridine, including other polymerizable vinyl carbocyclic and vinyl heterocyclic aromatics. Other polymerizable ethylenically unsaturated monomers include other alkyl styrenes such as o-ethyl-styrene, halostyrenes such as 2,3-dichloro styrene, vinyl chloride, vinyl acetate, vinyl propionate, vinylidene chloride, and the lower alkyl esters such as the methyl, ethyl, or butyl esters of acrylic or methacrylic acids, as well as the monomeric forms of the polymers listed above, such as butadiene, cyclopentadiene, piperylene, acrylonitrile and chloroprene.

The polymer can be merely dissolved in the monomer with or without a catalyst such as a peroxide and with or without other additives, and heated until the desired degree of prepolymerization is obtained. When no catalyst is used the heating is for a long period such as 3 to 18 hours at temperatures from about 200 to 225°, variable with the amount of prepolymerization desired, usually less than about 40 percent of the monomer present. Use of 0.01 to 0.20 percent peroxy catalyst shortens the polymer time. The viscous prepolymer solution is then suspension polymerized, usually with a peroxy catalyst. The effect of such graft is a modification of the rubbery polymer molecules with crystal polymer to improve its properties including hardness, durability, flexibility, transparency, moldability and the like.

Conversely, by the present method, and in another aspect of the present invention, a prepolymer of the crystalline type can be dissolved in a rubber-forming type of ethylenically unsaturated polymerizable monomer; for instance, crystal polymer of the character of polystyrene, or other polymer or copolymer of the monomers listed above, may be dissolved in a rubber-forming monomer or mixture of monomers, such as a solution of such polymer in one or more liquid monomers of the group butadiene, styrene, acrylonitrile, isobutylene, piperylene, isoprene, chloroprene, divinyl benzine, vinyl acetylene, and the like, and that solution can be partially polymerized up to the range of 5 to 40 percent, preferably 20 to 30 percent and then suspension polymerized to homogeneous mixed polymer in the form of rubbery beads, according to the present method.

In a third aspect of this invention, it is found that the suspension polymerization proceeds so reliably with the polyvinyl alcohol and insoluble phosphate suspension agent that it is not essential to preliminarily mass polymerize the polymer solution en masse before completion in the suspension system. It is possible to merely form the solution of polymer in polymerizable ethylenically unsaturated monomer, and directly effect the polymerization of the solution in the suspension system using PVA combined with insoluble phosphate particles as suspending agent. Useful polymers and copolymers as well as monomers are listed above.

It is found that the combination of PVA with fine particles of phosphate as suspending agents give such fine beads of controllable particle size under widely variable suspension conditions and with or without use of other bath additives and modifiers, that improved polymerization for any type of polymerizable ethylenically unsaturated monomer, such as above listed or mixtures thereof, is made available.

In the usual procedure to effect the suspension polymerization, apart from preliminary mass polymerization, the suspension water has added thereto fine particles of phosphate or has the phosphate particles suspended therein by forming them in situ in the suspension water, and is then maintained as a suspension with agitation. The polyvinyl alcohol is dissolved in the suspension water together with any other optionally used additives that would be used in the system. The liquid monomer or monomer solution of polymer, together with peroxy catalyst and other useful additive components, as desired, is then added to the stirred aqueous suspension and the agitation is continued until the liquid monomer, broken up into small droplets by the agitation, and maintained as such over a several hour period of reaction, from 3 to 24 hours of continuous agitation, during which period the hard polymerized beads are formed in suspension. The temperature of the system is raised as desired. Usually the water, at the start, is relatively cool or at a moderate temperature of about 60° C. and preferably is gradually warmed so that after approximatley one hour the temperature is in about the range of 85°–100° C., and may even be raised above that point by applied pressure, temperatures up to about 140° C. being feasible. The higher temperatures and larger quantities of catalyst tend to accelerate the rate of the polymerization reaction.

The various materials listed above as useful in the several aspects of these processes can be widely varied in proportions. The water in the suspension system itself can be in larger quantities, but the system is most economically operated in a ratio range of from about 2 down to about 0.7 part of water per part of polymerizable material.

The polyvinyl alcohol may be used in a broad range of proportions from about 0.001 to 5 percent, preferably about 0.1 to 3 percent by weight of the suspension system. Any of several commercial grades are useful, variable in the degree of hydrolysis from about 70 to 100 percent, and also with correspondingly variable molecular weight and viscosity. In the examples below we use PVA of from about 95 to 99 percent hydrolyzed and a viscosity of from about 4 to 65 centipoises (4% in water). In the quantity range given the smaller quantity of PVA is best supplemented by larger quantities of phosphate, and conversely, where larger quantities of PVA are used, such as more than 0.1 percent, lower quantities of phosphate may be used.

The insoluble phosphate may be used in quantities ranging from about 0.01 to about 5 percent by weight of the system, preferably variable in quantity inversely with the PVA as indicated above, typically using calcium, barium, or magnesium, of which hydroxy apatite is the most commonly used. For desired reproducibility of particle size of phosphate as suspended insoluble particles in the system, preferably sized to the range of about 0.005 to 0.05 micron, a soluble phosphate salt is first dissolved in the suspension water and then treated with a recipitant solution comprising any soluble salt of a precipitating cation such as lime or other soluble salt of calcium, barium, or magnesium, preferably for constant conditions, at the boiling point of the suspension water.

The peroxy catalyst may be any catalytic organic peroxide commonly used for this purpose, such as dibenzoyl peroxide, dicaproyl peroxide, dilauroyl peroxide, dietertiarybutyl peroxide, or mixtures of these. The peroxide is usually used in quantity from 0.0005 to 2 percent, although the preferred range is about 0.1 to 0.5 percent, larger quantities tending to accelerate the polymerization. The peroxide, as stated, is used to accelerate polymerization in the suspension system; and it may optionally, but not essentially, be used to accelerate prepolymerization en masse.

Other components added to the suspension system are optional and may be omitted. Such components usually are added in quantity less than about 2 percent. For instance, a mercaptan modifier such as dodecyl mercaptan may be added in quantity up to about 2 percent.

Sometimes surface-active agents, usually sulfate esters of aliphatic alcohols ranging from about 6 to 14 carbon atoms, such as caproyl sulfate or octyl sulfate can optionally be added to the suspension system in quantity up to 1 percent typically, and 0.01 to 0.5 percent. A lubricant is sometimes added for improved polymer properties and for this purpose a quantity of high molecular ester of a fatty acid such as butyl stearate in quantity up to about 5 percent, and usually 1 to 2 percent can be used.

Sometimes the polymerizable monomer contains, or has added thereto, a small quantity of an anti-oxidant such as an alkyl aryl phosphite such as tri nonyl phenyl phosphite, available under the trademark Polygard, in quantity down to about 0.0001, and usually less than 0.50 percent for improved bead stability.

The monomer hereof is a liquid usually available commercially in various degrees of purity. However, the term monomer is used herein in a generic sense to include other polymerizable relatively ready flowing liquids such as liquid polymerizable dimers or trimers of said monomers. Sometimes the monomer contains dimer and other low molecular weight polymerizable derivatives of the monomer merely as impurity. Sometimes the dimers and trimers are deliberately formed from the monomer and used as the "liquid monomer" solvent, and that liquid low polymer may also contain some monomer in admixture therewith.

Accordingly, it will be understood that all such polymerizable solvent liquids useful for polymerizing in suspension to solids, and in which solid polymers are readily dissolved for conversion to graft polymer are included within the meaning of the term "polymerizable monomer," as that term is used herein.

The solid polymer or copolymer, preferably natural or synthetic rubber, is dissolved in quantity to have up to about 40 percent in the said "monomer" with or without a small quantity of peroxy catalyst, and that solution is either first polymerized en masse by heating until up to about 40 percent monomer has polymerized and a somewhat viscous but flowable liquid is formed, and that partially polymerized solution is then suspension polymerized, usually adding some peroxy catalyst if too little or none is present.

According to present method, the particle sizes of the beads formed are reliably controlled as desired; for instance, using a greater quantity 3 to 5 percent of PVA and about 1.75 percent phosphate, a large bulk of the beads are in the range of 40–60 mesh. The particles become progressively larger as the quantity of phosphate is reduced.

The practice of this process is further illustrated by the following examples:

*Example 1*

100 parts of styrene monomer are added to a stirred, heated vessel. Six parts of a rubbery copolymer of 25 percent styrene and 75 percent butadiene are added to the vessel and dissolved with heating and stirring. To this solution is added 0.03 part of dodecyl mercaptan as a modifier. This mixture is stirred at 95° for 7 hours, until approximately 20 percent of the styrene monomer is polymerized. This partially polymerized mass is then added to the following agitated mixture:

|  | Parts |
|---|---|
| Distilled water | 100 |
| Trisodium phosphate | 0.3 |
| Calcium chloride | 0.39 |
| Polyvinyl alcohol | 0.10 |
| Lecithin | 0.0036 |
| Anionic 08 | 0.12 |

The suspended mixture is polymerized further at 95° C. until 30–40 percent is polymerized. At this time 0.4 part of benzoyl peroxide is added and the temperature raised to 105° C. The reaction is carried to completion at this temperature requiring about 6 hours. A finishing temperature of 115° C. can be applied for an additional hour to achieve a greater polymerization.

The finished polymer consisting of small, spherical beads is acidified to 3.0 pH, washed thoroughly and dried. The beads are very uniform in the following approximate U.S. standard screen size distribution:

|  | Percent |
|---|---|
| On 10 mesh | 0.0 |
| On 20 mesh | 1.1 |
| On 40 mesh | 82 |
| On 60 mesh | 5.5 |
| Through 100 mesh | 0.2 |

When molded, this graft polymer has a high degree of transparency, light color, and an impact strength of 2.2 ft. lbs. per inch as compared to straight crystalline polystyrene with 0.3 ft. lb. per inch.

*Example 2*

The same partially prepolymerized mass prepared as in Example 1 is added to the following agitated mixture:

|  | Parts |
|---|---|
| Distilled water | 100 |
| Trisodium phosphate | 0.05 |
| Calcium chloride | 0.065 |
| Polyvinyl alcohol | 1.0 |
| Lecithin | 0.0036 |
| Anionic 08 | 0.12 |

The suspended mixture is carried to completion with the addition of peroxide and heat, and treated as in Example 1. The finished polymer has the following approximate particle size:

|  | Percent |
|---|---|
| On 10 mesh | 0.0 |
| On 20 mesh | 6.4 |
| On 40 mesh | 87.5 |
| On 60 mesh | 5.1 |
| Through 100 mesh | Nil |

The physical characteristics of the polymer except the particle size variation are essentially the same as in Example 1.

*Example 3*

100 parts of styrene monomer are added to a stirred vessel as in Example 1 and 20 parts of natural rubber is added to the styrene and dissolved. To this solution is added 0.05 part dodecyl mercaptan modifier, 0.2 part of Polygard as anti-oxidant, and 0.08 part benzoyl peroxide catalyst. This mass is stirred at 85° C. until 5 percent of the monomer is prepolymerized. This mass is then added to the following agitated mixture:

|  | Parts |
|---|---|
| Distilled water | 100 |
| Trisodium phosphate | 0.60 |
| Calcium chloride | 0.78 |
| Polyvinyl alcohol | 3.0 |
| Lecithin | 0.0036 |
| Anionic 08 | 0.12 |

The suspended mixture is polymerized further at 85° C. until 30 to 40 percent of the monomer is polymerized. At this time 0.45 additional part of benzoyl peroxide is added and the temperature raised to 95° C. The reaction is carried to completion at this temperature requiring about 7 hours.

The finished polymer consisting of small spherical beads is treated as in Example 1. The particle size distribution is as follows:

|  | Percent |
|---|---|
| On 10 mesh | 0.0 |
| On 20 mesh | 13.2 |
| On 40 mesh | 79.5 |
| On 60 mesh | 6.7 |
| Through 100 mesh | 0.1 |

The molded product has an impact strength of 5.8 ft. pounds per inch.

*Example 4*

100 parts of styrene monomer are stirred in a heated vessel. Thirty parts of GRS 75/25 rubber are added and stirred until dissolved. To this solution is added 0.06 part of dodecyl mercaptan modifier and 0.09 part of benzoyl peroxide catalyst. Immediately it is added to the following agitated mixture:

|  | Parts |
|---|---|
| Distilled water | 100 |
| Trisodium phosphate | 0.80 |
| Calcium chloride | 1.04 |
| Polyvinyl alcohol | 5.0 |
| Lecithin | 0.0036 |
| Anionic 08 | 0.12 |

The suspended solution of GRS rubber in styrene is polymerized at 85° C. until 30–40 percent of the monomer is polymerized. At this time 0.47 part of additional benzoyl peroxide is added and the reaction is carried to completion at this temperature, requiring about 8 hours. The finished polymer consisting of small spherical beads is treated as in Example 1. The particle size distribution is as follows:

| | Percent |
|---|---|
| On 10 mesh | 0.0 |
| On 20 mesh | 2.1 |
| On 40 mesh | 20.2 |
| On 60 mesh | 72.5 |
| Through 100 mesh | 0.1 |

The molded product has an impact strength of 10.5 ft. lbs. per inch.

*Example 5*

100 parts of styrene monomer and 0.2 parts benzoyl peroxide are added to a stirred, heated, vessel containing the following mixture:

| | Parts |
|---|---|
| Distilled water | 100 |
| Trisodium phosphate | 0.20 |
| Calcium chloride | 0.26 |
| Polyvinyl alcohol | 0.001 |
| Lecithin | 0.0036 |
| Anionic 08 | 0.12 |

The suspended system is heated and agitated at 95° C. for approximately 8 hours to achieve 99% conversion. Further heating at higher temperature may be used if more polymerization is required. The finished polymer consisting of small spherical beads is acidified to 3.0 pH and washed thoroughly, then dried. The uniformity of the particles is shown by the following particle size distribution:

| | Percent |
|---|---|
| On 10 mesh | 0.0 |
| On 20 mesh | 0.1 |
| On 40 mesh | 96.9 |
| On 60 mesh | 2.0 |
| Through 100 mesh | Nil |

Polymer with the above size distribution lends itself readily to thorough washing and drying operations. This in turn produces a clearer, purer final polymer product.

The use of polyvinyl alcohol to support the insoluble phosphate suspension system allows the simplification of the overall system although a slightly wider particle size distribution may be obtained. The following example shows this:

*Example 6*

100 parts styrene monomer and 5 parts of GRS rubber are added to a heated vessel and stirred until the rubber dissolves and 0.02 part of dodecyl mercaptan modifier and 0.04 part of benzoyl peroxide are added. The mass is stirred and heated at 85° C. until 20% polymerization is achieved and then suspended in the following mixture:

| | Parts |
|---|---|
| Distilled water | 100 |
| Trisodium phosphate | 0.30 |
| Calcium chloride | 0.39 |
| Polyvinyl alcohol | 0.30 |

The suspended mixture is reacted further until 30–40% polymerization is achieved and then 0.40 additional part benzoyl peroxide are added and polymerization continued at 95° C. until essentially complete conversion is achieved. The product is acidified, washed, and dried as in Example 1. The bead product shows the following size distribution:

| | Percent |
|---|---|
| On 10 mesh | 0.0 |
| On 20 mesh | 25.2 |
| On 40 mesh | 40.2 |
| On 60 mesh | 27.3 |
| Through 100 mesh | 1.2 |

Thus, without the use of surfactants, a poorer particle size distribution is obtained. However, with the use of polyvinyl alcohol, the surfactants are not a necessity in producing a usable bead polymer product.

*Example 7*

A polymer batch is polymerized to 30–40 percent as described in Example 1, using initially 0.059 part of benzoyl peroxide as a catalyst and heating at 95° C. Instead of adding additional catalyst, the reaction temperature is increased to 125° C. (under pressure) and held until essentially complete conversion is achieved, requiring about 6 hours. Further processing at higher temperatures such as 130–140° C. may be used if greater conversion is desired. The finished polymer is processed as in Example 1. A similar particle size range is obtained. That product obtained has slightly different molding characteristics which is desirable for some uses.

*Example 8*

A partially prepolymerized mass is produced as in Example 1. It is then suspended in the following mixture:

| | Parts |
|---|---|
| Distilled water | 80 |
| Trisodium phosphate | 0.3 |
| Calcium chloride | 0.39 |
| Polyvinyl alcohol | 0.22 |
| Lecithin | 0.0036 |
| Anionic 08 | 0.12 |

The reaction mixture is then carried to completion as in Example 1. The decreased water to monomer ratio is offset by the increase in polyvinyl alcohol to obtain a bead product of essentially the same particle size.

Certain modifications will occur to those skilled in the art. It is possible to substantially modify the character of the beads as to hardness and flexibility by variation of the quantity of preformed polymer dissolved in the monomer before final graft polymerization. Useful coloring compounds, dyes, fillers, and other additives can be added to the monomer solution before polymerization. Such additives can be added to the completed beads also. Accordingly, it is intended that the examples herein be interpolated as illustrative and not limiting except as defined in all claims appearing hereto.

We claim:

1. Method of graft polymerization comprising dissolving rubbery polymer in a polymerizable ethylenically unsaturated monomer liquid and suspending said solution in a hot agitated aqueous bath containing a small quantity of a polyvinyl alcohol and a phosphate of the group consisting of calcium, barium and magnesium, the polyvinyl alcohol being in the range of about .001 to 5%, and the phosphate being in the range of about 0.01 to 5%, the component suspending agents being variable in quantity within the said ranges whereby the said minimum quantity of polyvinyl alcohol will be increased to at least 0.1% when the phosphate is near the minimum quantity of its range.

2. The method as defined in claim 1 wherein the ratio of the bath components is in the range of 2 to 0.7 parts of water per part of polymerizable solution.

3. The method comprising dissolving a solid polymer of the group consisting of polystyrene, polybutadiene, polyisoprene, polycyclopentadiene, natural rubber, chlorinated rubber, copolymer of butadiene with styrene, copolymer of butadiene with acrylonitrile, copolymer of styrene with acrylonitrile, copolymer of styrene with isobutylene and copolymers of butadiene with isobutylene in a liquid monomer of a group consisting of a vinyl aromatic compound, vinyl chloride, vinyl acetate, vinyl propionate, vinylidene chloride, lower alkyl esters of acrylic acid, lower alkyl esters of methacrylic acid, butadiene, piperylene, isoprene, chloroprene, acrylonitrile, and mixtures of said monomers, and suspending said solution together with a small quantity of peroxy catalyst in a hot agitated aqueous bath containing a small quantity of polyvinyl alcohol in the range of about 0.001 to 5% and a small quantity of insoluble particles of a phosphate of the group consisting of calcium, barium and magnesium in the range of about 0.01 to 5%, the percent being by weight, said minimum quantity of polyvinyl alcohol being increased to at least about 0.1% when the quantity of phosphate is near the minimum of its range.

4. The method as defined in claim 1 wherein the solution of polymer in monomer is first partially polymerized en masse to a substantial degree, but less than sufficient to render the solution non-fluid, and then further polymerizing the partially polymerized solution to bead form in said aqueous bath.

5. The method as defined in claim 1 wherein the polymerizable monomeric liquid is a vinyl aromatic compound.

6. The method as defined in claim 1 wherein the polymerizable monomeric liquid is styrene.

7. The method as defined in claim 1 wherein the polymerizable monomeric liquid comprises a diene.

8. The method as defined in claim 1 wherein the polymerizable liquid comprises methyl styrene.

9. The method as defined in claim 1 wherein the polymerizable liquid comprises butadiene.

10. The method as defined in claim 1 wherein the rubbery polymer is a copolymer of styrene and butadiene.

11. The method as defined in claim 10 wherein the monomer is styrene.

12. Method of graft polymerizing as defined in claim 3 wherein the solid polymer is a rubbery polymer dissolved in monomeric styrene in quantity of about 5-40 percent, comprising adding a small quantity of an oxidation type catalyst thereto and then polymerizing said solution to bead form by suspending it in a hot agitated aqueous bath containing a small quantity of polyvinyl alcohol and a small quantity of insoluble particles of a phosphate of the group consisting of calcium, barium and magnesium.

13. Method defined in claim 12 wherein the solution of polymer in monomer is first polymerized en masse until the styrene has been polymerized to a substantial degree, but less than sufficient to render the solution non-fluid.

14. Method defined in claim 13 wherein the mass prepolymerization is effected by heat in the absence of catalyst.

15. Method defined in claim 13 wherein the mass polymerization is effected in the presence of a small quantity of peroxy catalyst and additional peroxy catalyst is added to the prepolymerized mass before final polymerization to bead form in suspension.

16. The method of graft polymerizing a solid polymer of an ethylenically unsaturated polymerizable monomer comprising dissolving said solid polymer in a solvent comprising polymerizable liquid diene, adding a small quantity of an oxidation type catalyst thereto and then polymerizing said solution to bead form by suspending it in a hot agitated aqueous bath containing a small quantity of polyvinyl alcohol in the range of about 0.001 to 5% and a small quantity of insoluble particles of a phosphate of the group consisting of calcium, barium and magnesium in the range of about 0.01 to 5%, the percent being by weight, said minimum quantity of polyvinyl alcohol being increased to at least about 0.1% when the quantity of phosphate is near the minimum of its range.

17. Method of graft polymerizing comprising heating a solution of about 5 to 40 percent of a copolymer of about 25 percent of styrene with 75 percent of butadiene in monomeric styrene until about 5 to 40 percent of the monomeric styrene is polymerized en masse, then agitating said partial polymer solution in an aqueous suspension in water in a ratio in the range of about 0.7 to 2 parts of water per part of partial polymer solution at a temperature in the range of about 60–140° C., said water containing a small quantity in the range of 0.001 to about 5 percent, of polyvinyl alcohol and a small quantity in the range of 0.01 to about 5 percent of insoluble phosphate particles of the group consisting of calcium, barium and magnesium the said minimum quantity of polyvinyl alcohol being increased to at least 0.1% when the phosphate is near the minimum quantity of its range, and continuing said agitation until the partial polymer is completely polymerized to the form of small substantially evenly sized beads.

18. Graft polymer beads formed by suspension polymerization of a solution of a solid polymer in a polymerizable ethylenically unsaturated monomer suspended in a hot aqueous bath containing polyvinyl alcohol in the range of about 0.001 to 5% and particles of an insoluble phosphate of the group consisting of calcium, barium and magnesium in the range of about 0.01 to 5%, the percent being by weight, said minimum quantity of polyvinyl alcohol being increased to at least about 0.1% when the quantity of phosphate is near the minimum of its range.

19. Graft polymer as defined in claim 18 wherein the solid polymer is a member of the group consisting of natural rubber, polystyrene, polybutadiene, polyisoprene, polycyclopentadiene, chlorinated rubber, copolymer of butadiene with acrylonitrile, copolymer of styrene and butadiene, copolymer of styrene and acrylonitrile and copolymer of styrene and isobutylene and copolymer of butadiene and isobutylene.

20. Bead polymer as defined in claim 18 wherein the polymerizable monomer is styrene.

21. Bead polymer as defined in claim 18 wherein polymerizable monomer is a liquid diene.

22. Bead polymer as defined in claim 18 wherein the polymerizable monomer is butadiene.

23. The method as defined in claim 1 wherein the rubbery polymer is a copolymer of butadiene and isobutylene.

24. The method as defined in claim 1 wherein the rubbery polymer is a copolymer of styrene and acrylonitrile.

25. The method as defined in claim 1 wherein the rubbery polymer is a copolymer of styrene and isobutylene.

26. Graft polymer as defined in claim 18 wherein the solid polymer is copolymer of styrene and butadiene.

27. Graft polymer as defined in claim 18 wherein the solid polymer is a copolymer of styrene and acrylonitrile.

28. Graft polymer as defined in claim 18 wherein the solid polymer is a copolymer of styrene and isobutylene.

29. Graft polymer as defined in claim 18 wherein the solid polymer is a copolymer of butadiene and isobutylene.

30. The method as defined in claim 1 wherein the rubbery polymer is polybutadiene.

31. Graft polymer as defined in claim 18 wherein the solid polymer is polybutadiene.

References Cited in the file of this patent

UNITED STATES PATENTS 2,886,553    Stein et al. _____ May 12, 1959

OTHER REFERENCES

Bovey et al.: "Emulsion Polymerization," Interscience Publishers, Inc., New York, 1955, pages 12–14 relied upon.

Schildknecht: "Polymer Processes," Interscience Publishers, Inc., New York, 1956, pages 75–81 relied upon.